US008589267B2

(12) United States Patent
Hurst

(10) Patent No.: US 8,589,267 B2
(45) Date of Patent: *Nov. 19, 2013

(54) SYSTEM AND METHOD FOR RE-DISTRIBUTING AND TRANSFERRING MOBILE GIFT CARDS

(75) Inventor: Douglas J. Hurst, Boulder, CO (US)

(73) Assignee: Mocapay, Inc., Denver, CO (US)

( * ) Notice: Subject to any disclaimer, the term of this patent is extended or adjusted under 35 U.S.C. 154(b) by 90 days.

This patent is subject to a terminal disclaimer.

(21) Appl. No.: 12/343,425

(22) Filed: Dec. 23, 2008

(65) Prior Publication Data

US 2009/0182663 A1 Jul. 16, 2009

Related U.S. Application Data

(60) Provisional application No. 61/018,809, filed on Jan. 3, 2008, provisional application No. 61/025,201, filed on Jan. 31, 2008.

(51) Int. Cl.
*G06Q 40/00* (2012.01)
*G06Q 40/02* (2012.01)
(52) U.S. Cl.
CPC ................................ *G06Q 40/02* (2013.01)
USPC ............... 705/35; 705/16; 705/42; 705/39; 705/38; 705/44; 705/30; 705/41; 705/64; 235/380; 455/435
(58) Field of Classification Search
USPC ........... 705/30–45, 16, 64; 235/380; 455/435, 455/406
See application file for complete search history.

(56) References Cited

U.S. PATENT DOCUMENTS

| 5,991,749 | A | 11/1999 | Morrill |
| 6,675,153 | B1 | 1/2004 | Cook et al. |
| 7,043,451 | B2 | 5/2006 | Strayer et al. |
| 7,155,411 | B1 | 12/2006 | Blinn et al. |
| RE39,736 | E | 7/2007 | Morrill |
| 7,275,685 | B2 | 10/2007 | Gray et al. |

(Continued)

FOREIGN PATENT DOCUMENTS

EP 2122557 11/2009
WO WO-2008-089383 A2 7/2008

OTHER PUBLICATIONS

Hurst, Douglas J., Office Action for U.S. Appl. No. 12/343,423 dated Jun. 24, 2010, 11 pgs.

(Continued)

*Primary Examiner* — Tien Nguyen
(74) *Attorney, Agent, or Firm* — Holland & Hart LLP

(57) ABSTRACT

A system and method for re-distributing and transferring mobile gift cards is described. One embodiment, a computer-server-based method, receives a selection of a particular mobile gift card belonging to the first user; receives a request to transfer a specified monetary amount from a balance of the particular mobile gift card to a second user; receives a phone number of the second user; associates, with the second user's phone number, a separate mobile gift card having an associated balance equal to the specified monetary amount; and transmits a notification of the separate mobile gift card to a mobile device associated with the second user's phone number; the computer server acting as a server-side wallet for the separate mobile gift card, and the separate mobile gift card being usable, through interaction with the computer server, by the second user for the purchase of goods from the particular merchant.

27 Claims, 7 Drawing Sheets

(56) References Cited

U.S. PATENT DOCUMENTS

| | | | |
|---|---|---|---|
| 7,315,828 B1* | 1/2008 | McCarthy et al. | 705/14.1 |
| 7,337,144 B1 | 2/2008 | Blinn et al. | |
| 7,395,242 B2 | 7/2008 | Blinn et al. | |
| 7,398,250 B2 | 7/2008 | Blinn et al. | |
| 7,512,552 B2 | 3/2009 | Karas et al. | |
| 7,657,489 B2 | 2/2010 | Stambaugh | |
| 7,707,120 B2 | 4/2010 | Dominguez et al. | |
| 7,716,082 B1 | 5/2010 | Blalock | |
| 8,083,135 B2 | 12/2011 | Hodgkinson et al. | |
| 8,290,858 B1* | 10/2012 | Ankarath | 705/39 |
| 2001/0029496 A1 | 10/2001 | Otto et al. | |
| 2002/0059146 A1 | 5/2002 | Keech | |
| 2002/0181710 A1 | 12/2002 | Adam et al. | |
| 2003/0018579 A1 | 1/2003 | Litster et al. | |
| 2003/0053609 A1* | 3/2003 | Risafi et al. | 379/114.2 |
| 2003/0154139 A1 | 8/2003 | Woo | |
| 2003/0200184 A1 | 10/2003 | Dominguez et al. | |
| 2004/0030659 A1 | 2/2004 | Gueh | |
| 2004/0049455 A1 | 3/2004 | Mohsenzadeh | |
| 2004/0103060 A1 | 5/2004 | Foth et al. | |
| 2004/0122685 A1 | 6/2004 | Bunce | |
| 2004/0230536 A1 | 11/2004 | Fung et al. | |
| 2005/0033686 A1 | 2/2005 | Peart et al. | |
| 2005/0177517 A1 | 8/2005 | Leung | |
| 2006/0016880 A1 | 1/2006 | Singer | |
| 2006/0036501 A1 | 2/2006 | Shahbazi et al. | |
| 2006/0111983 A1 | 5/2006 | Malison | |
| 2006/0224470 A1 | 10/2006 | Garcia Ruano et al. | |
| 2006/0235795 A1 | 10/2006 | Johnson et al. | |
| 2006/0235796 A1 | 10/2006 | Johnson et al. | |
| 2006/0265243 A1 | 11/2006 | Racho et al. | |
| 2007/0022058 A1 | 1/2007 | Labrou et al. | |
| 2007/0063020 A1* | 3/2007 | Barrafato | 235/380 |
| 2007/0138268 A1 | 6/2007 | Tuchman | |
| 2007/0175928 A1* | 8/2007 | Arcuri et al. | 222/401 |
| 2007/0175978 A1* | 8/2007 | Stambaugh | 235/379 |
| 2007/0179888 A1* | 8/2007 | Angelovich | 705/41 |
| 2007/0198354 A1 | 8/2007 | Senghore et al. | |
| 2007/0203778 A1 | 8/2007 | Lowson et al. | |
| 2007/0205275 A1 | 9/2007 | Nicola et al. | |
| 2007/0239556 A1 | 10/2007 | Wagner | |
| 2007/0288392 A1 | 12/2007 | Peng et al. | |
| 2008/0011825 A1 | 1/2008 | Giordano et al. | |
| 2008/0046366 A1 | 2/2008 | Bemmel et al. | |
| 2008/0052164 A1* | 2/2008 | Abifaker | 705/14 |
| 2008/0052189 A1 | 2/2008 | Walker et al. | |
| 2008/0072226 A1* | 3/2008 | Armes et al. | 718/101 |
| 2008/0077527 A1 | 3/2008 | Choe et al. | |
| 2008/0097851 A1 | 4/2008 | Bemmel et al. | |
| 2008/0103984 A1 | 5/2008 | Choe et al. | |
| 2008/0189189 A1 | 8/2008 | Morgenstern | |
| 2008/0207234 A1 | 8/2008 | Arthur et al. | |
| 2008/0208741 A1 | 8/2008 | Arthur et al. | |
| 2008/0208742 A1 | 8/2008 | Arthur et al. | |
| 2008/0208743 A1* | 8/2008 | Arthur et al. | 705/41 |
| 2008/0208744 A1 | 8/2008 | Arthur et al. | |
| 2008/0208762 A1 | 8/2008 | Arthur et al. | |
| 2008/0223918 A1 | 9/2008 | Williams et al. | |
| 2008/0235122 A1* | 9/2008 | Weitzman | 705/35 |
| 2008/0249938 A1 | 10/2008 | Drake-Stoker | |
| 2008/0255941 A1 | 10/2008 | Otto et al. | |
| 2008/0255947 A1 | 10/2008 | Friedman | |
| 2008/0267117 A1 | 10/2008 | Stern | |
| 2008/0281737 A1 | 11/2008 | Fajardo | |
| 2008/0296368 A1* | 12/2008 | Newsom | 235/380 |
| 2009/0012901 A1 | 1/2009 | Singh et al. | |
| 2009/0037286 A1 | 2/2009 | Foster | |
| 2009/0063312 A1 | 3/2009 | Hurst | |
| 2009/0112709 A1* | 4/2009 | Barhydt et al. | 705/14 |
| 2009/0138366 A1 | 5/2009 | Bemmel et al. | |
| 2009/0164326 A1 | 6/2009 | Bishop et al. | |
| 2009/0164331 A1 | 6/2009 | Bishop et al. | |
| 2009/0171804 A1* | 7/2009 | Lee et al. | 705/26 |
| 2009/0179074 A1 | 7/2009 | Hurst | |
| 2009/0182663 A1 | 7/2009 | Hurst | |
| 2009/0182676 A1 | 7/2009 | Barbier et al. | |
| 2009/0265241 A1 | 10/2009 | Bishop et al. | |
| 2009/0298481 A1 | 12/2009 | Hurst | |
| 2009/0307132 A1 | 12/2009 | Phillips | |
| 2010/0010918 A1* | 1/2010 | Hunt | 705/27 |
| 2010/0030698 A1 | 2/2010 | Goodin | |
| 2010/0041368 A1* | 2/2010 | Kumar | 455/407 |
| 2010/0063895 A1 | 3/2010 | Dominguez et al. | |
| 2012/0028612 A1 | 2/2012 | Hurst | |
| 2012/0030044 A1 | 2/2012 | Hurst | |

OTHER PUBLICATIONS

International Search Report and Written Opinion, Int'l App. No. PCT/US08/51395, dated Jul. 8, 2008, 7 pgs.

European Search Report and Opinion, EP App. No. 08705998.6, dated Dec. 29, 2010, 5 pgs.

European Patent Office, "Notice from the European Patent Office dated Oct. 1, 2007 concerning business methods" Official Journal of the European Patent Office, vol. 30, No. 11, Nov. 1, 2007, pp. 592-593.

* cited by examiner

SYSTEM AND METHOD FOR RE-DISTRIBUTING AND TRANSFERRING MOBILE GIFT CARDS

PRIORITY

The present application claims priority from both of the following U.S. provisional patent applications: Application No. 61/018,809, entitled "System and Method for Distributing Mobile Gift Cards," filed on Jan. 3, 2008; and Application No. 61/025,201, entitled "System and Method for Re-Distributing and Transferring Mobile Gift Cards," filed on Jan. 31, 2008; both of which are incorporated herein by reference in their entirety.

RELATED APPLICATIONS

The present application is related to commonly owned and assigned application Ser. No. 12/343,423, entitled "System and Method for Distributing Mobile Gift Cards," filed herewith.

FIELD OF THE INVENTION

The present invention relates generally to electronic commerce. More specifically, but not by way of limitation, the present invention relates to systems and methods for re-distributing and transferring mobile gift cards.

BACKGROUND OF THE INVENTION

Gift cards have become increasingly popular in recent years, and racks containing gift cards for various merchants are commonplace at grocery stores, convenience stores, street vendors, and other locations. One person pays the merchant (or a distributor marketing gift cards for the merchant) a specified amount of money for the gift card and gives the gift card to another person (the recipient or holder of the gift card) as a gift. The holder of a gift card is then able to purchase, from any merchant associated with that gift card, goods or services costing less than or equal to the monetary value associated with the gift card. Merchants like gift cards because they receive the funds immediately, and the gift-card makes it very likely that the recipient will visit the merchant's store or Web site. Though gift cards have the same value as cash, one disadvantage of conventional gift cards is that the user has to physically present the card to a merchant when using it to make a purchase. This burden is worsened if the card is ever lost because replacement gift cards are generally unavailable.

Attempts have been made to overcome some of the disadvantages of typical plastic, magnetically encoded gift cards. For example, various kinds of electronic gift cards and electronic gift certificates have been developed, but these have their own disadvantages. Specifically, fulfillment can take several days, preventing an electronic-gift-card recipient from making immediate use of the electronic gift card or gift certificate. Also, electronic gift cards stored in the holder's mobile device (e.g., a cellular telephone) make the mobile device an enticing target for theft.

A system and method is thus needed to overcome the inherent limitations of conventional physical and electronic gift cards.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

The present invention can provide a system and method for distributing mobile gift cards. One illustrative embodiment is a computer-server-based method for transferring a mobile gift card from a first user to a second user, comprising receiving, from a list of one or more mobile gift cards associated with a phone number of the first user, a selection of a particular mobile gift card, the particular mobile gift card being associated with a particular merchant; receiving a request to transfer a specified monetary amount from a balance of the particular mobile gift card to a second user; receiving a phone number of the second user; associating, with the second user's phone number, a separate mobile gift card having an associated balance equal to the specified monetary amount, the separate mobile gift card being associated with the particular merchant; and transmitting a notification of the separate mobile gift card to a mobile device associated with the second user's phone number; wherein the computer server acts as a server-side wallet for the separate mobile gift card, and the separate mobile gift card is usable, through interaction with the computer server, by the second user for the purchase of goods from the particular merchant.

Another illustrative embodiment is a system for transferring a mobile gift card, comprising at least one processor; and a memory containing a plurality of program instructions executable by the at least one processor, the plurality of program instructions being configured to cause the at least one processor to receive, from a list of one or more mobile gift cards associated with a phone number of the first user, a selection of a particular mobile gift card, the particular mobile gift card being associated with a particular merchant; receive a request to transfer a specified monetary amount from a balance of the particular mobile gift card to a second user; receive a phone number of the second user; associate, with the second user's phone number, a separate mobile gift card having an associated balance equal to the specified monetary amount, the separate mobile gift card being associated with the particular merchant; and transmit a notification of the separate mobile gift card to a mobile device associated with the second user's phone number; wherein the system acts as a server-side wallet for the separate mobile gift card, and the separate mobile gift card is usable, through interaction with the system, by the second user for the purchase of goods from the particular merchant.

These and other embodiments are described in further detail herein.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying drawings, wherein:

DETAILED DESCRIPTION

In various illustrative embodiments of the invention, the limitations of conventional physical and electronic gift cards are overcome by replacing the physical form factor of a plastic, magnetically encoded gift card with a mobile device such as a cellular telephone in a manner that leaves intact existing gift-card systems and services operated by gift-card service providers such as FIRST DATA and COMDATA.

A mobile-gift-card platform in accordance with these illustrative embodiments provides, among other things, a server-side digital wallet for mobile gift cards that overcomes the shortcomings (e.g., risk of loss or theft) associated with virtual gift cards or gift certificates that reside within the mobile device itself. In these illustrative embodiments, no credentials (account numbers, balances, or other sensitive information) associated with the mobile gift card reside in the mobile device itself. Instead, a secure network infrastructure distributes and manages the mobile gift cards and their associated credentials, the mobile device acting merely as one means for the user to communicate with the server-side digital wallet to access a variety of flexible services surrounding use of the mobile gift cards.

Such flexible services include, without limitation, the ability of a user to view a list of all available mobile gift cards in his or her server-side digital wallet, the ability to view the current balance of any particular mobile gift card, the ability to purchase securely goods or services from the merchant associated with a particular gift card using the mobile device at the point of sale (however, the option to use a physical card is not preempted by the mobile-gift-card platform described herein), and the ability to transfer some or all of the balance of a particular mobile gift card to another person.

Figure 1:
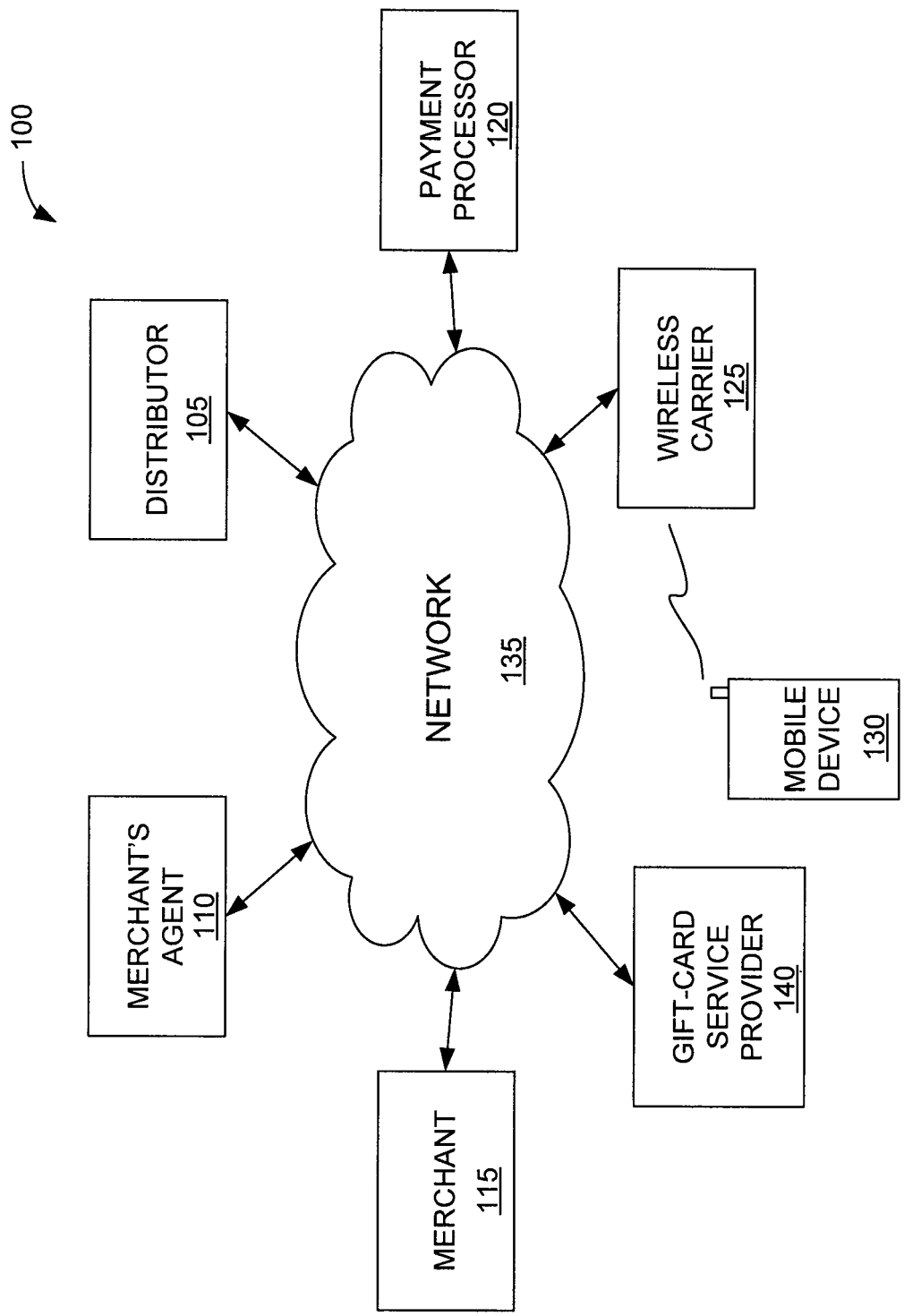
FIG. 1 is a functional block diagram of an environment in which various illustrative embodiments of the invention can be implemented.

Referring now to the drawings, where like or similar elements are designated with identical reference numerals throughout the several views, and referring in particular to FIG. 1, it is a functional block diagram of an environment 100 in which various illustrative embodiments of the invention can be implemented. In environment 100, distributor 105, merchant's agent 110, merchant 115, payment processor 120, wireless carrier 125, and gift-card service provider 140 are able to communicate with one another via network 135. A user's mobile device 130—e.g., a cellular or Personal Communication Service (PCS) phone—is also able to communicate with nodes connected with network 135 via wireless carrier 125. In some embodiments, network 135 includes, but is not necessarily limited to, the Internet.

The environment 100 in FIG. 1 builds on existing gift-card systems operated by gift-card service providers 140 such as, without limitation, FIRST DATA and COMDATA. Gift-card service provider 140, among other things, administers the financial aspects of gift cards, including keeping track of the balance associated with a particular gift card, settlement, reporting to merchants, and other functions.

Merchant 115 sells goods, services, or both and provides mobile gift cards to consumers with the assistance of merchant's agent 110. That is, merchant's agent 110 facilitates the distribution and sale of mobile gift cards issued by merchant 115 by acting as an intermediary between merchant 115 and any of the following: (1) a gift-card service provider 140, (2) mobile-gift-card distributors 105, (3) mobile-gift-card purchasers (those giving the mobile gift cards to others), and (4) mobile-gift-card recipients (consumers who use the mobile gift cards in commerce). A consumer holding such a mobile gift card can use the mobile gift card to purchase goods or services from the particular merchant that issued the mobile gift card, as explained above. How the holder of a mobile gift card uses the mobile gift card to make purchases from the issuing merchant is discussed further below.

Payment processor 120 processes the source of funds for transactions carried out from a user's mobile device such as the user's reloading of a mobile gift card or purchase of a mobile gift card on behalf of someone else. In such transactions, payment processor 120 acts as an agent of the merchant to collect funds from the user's credit card or other payment source. In some embodiments, an entity acting as a payment processor 120 in certain contexts may also be a distributor 105 in other contexts.

Distributor 105 markets mobile gift cards and, in some embodiments, is somewhat analogous to an entity such as grocery store chain SAFEWAY, which markets conventional plastic, magnetically encoded gift cards for a variety of other merchants on racks in its grocery stores with the assistance of a conventional-gift-card merchant's agent such as BLACKHAWK or IDT. Distributor 105 can take on a variety of different forms, depending on the particular embodiment.

In one embodiment, distributor 105 is an entity (not necessarily a merchant) that operates a Web site or other electronic communication channel where mobile gift cards for a number of different merchants are offered in an aggregated fashion. In another embodiment, a single merchant markets its mobile gift cards via remote distribution channels, local distribution channels, or both. For example, a merchant may market its mobile gift cards via a remote distribution channel such as a Web site or other networked electronic communication channel using Application Programming Interfaces (APIs) supplied by merchant's agent 110 or another entity. That is, a merchant may use flexible APIs provided by merchant's agent 110 to customize a Web site or other networked electronic communication channel to offer its mobile gift cards in a manner consistent with the merchant's particular brand identify, logos, etc. A merchant may also employ local distribution methods in a store (at the point of sale). In such an embodiment, the mobile gift card can be "mobilized" (made accessible to the recipient via the recipient's mobile device) at the point of sale.

In yet another embodiment, distributor 105 is a social networking Web site where the interests and preferences of a potential mobile-gift-card recipient are revealed to that person's friends and family. For example, John may discover on the social networking Web site FACEBOOK (www.facebook.com) that his friend Alan likes to shop at BEST BUY, and John can purchase a BEST BUY mobile gift card for Alan at the social networking site. The above are merely a few examples of distributors 105. Mobile gift cards can be marketed in a wide variety of ways and settings.

In an illustrative embodiment, merchant 115 receives the funds from a user's purchase of a mobile gift card minus a predetermined fee that is paid to the merchant's agent 110.

Figure 2:
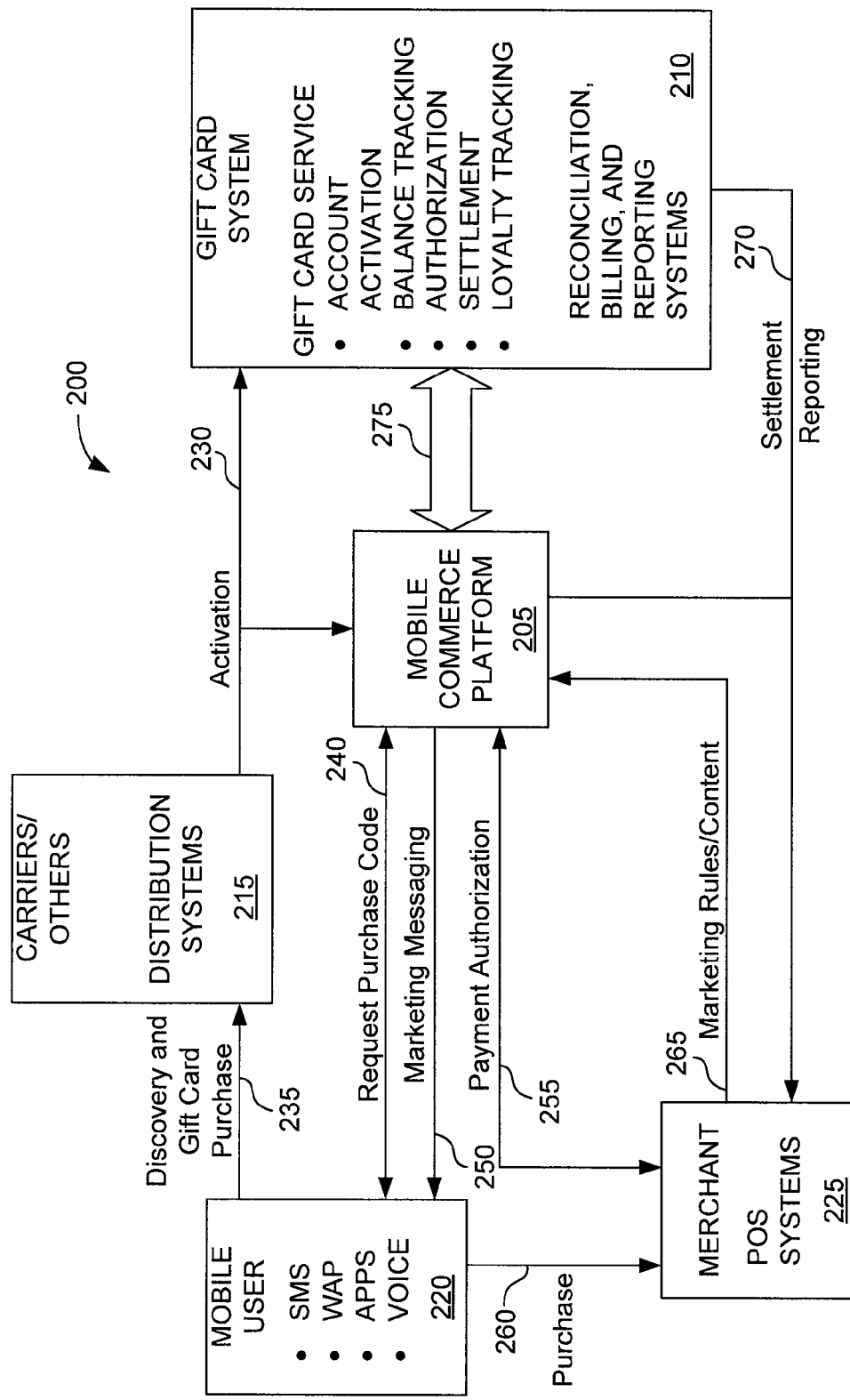
FIG. 2 is a diagram showing interactions among various entities involved in the distribution and use of mobile gift cards, in accordance with an illustrative embodiment of the invention.

FIG. 2 is a diagram showing interactions among various entities 200 involved in the distribution and use of mobile gift cards, in accordance with an illustrative embodiment of the invention. In FIG. 2, gift card system 210 represents a system operated by a conventional gift-card service provider 140 such as, without limitation, FIRST DATA or COMDATA. Various embodiments of the invention preserve the existing payments infrastructure supporting the use of gift cards and overlay them with a mobile commerce platform 205, which is explained below. Other entities involved are a mobile-payments-enabled merchant (sometimes called simply a "merchant" herein) 225, a mobile user 220, and carriers or other entities ("CARRIERS/OTHERS" in FIG. 2) 215 and their associated distribution systems (see distributor 105 in FIG. 1). In the discussion of FIG. 2 below, interactions among these entities are identified by their corresponding reference numerals in parentheses.

In some embodiments, mobile user 220 can use a variety of different access methods such as, without limitation, Short Message Service (SMS) messages, Multimedia Message Service (MMS) messages, Wireless Access Protocol (WAP), an application, or voice to obtain one-use perishable authorization codes (240) from mobile commerce platform 205 in making payments from a variety of different tenders (forms of payment), including mobile gift cards. Mobile user 220 can also use a variety of methods, including the above examples, to provide one-use perishable authorization codes to merchants 225 in making electronic purchases (260). Additional details regarding such mobile-payment technology can be found in U.S. patent application Ser. No. 11/624,620, entitled "Systems and Method for Secure Wireless Payment Transactions," which is incorporated herein by reference in its entirety.

Mobile user 220 may also receive targeted marketing messages (250) before, during, or after a mobile purchase via mobile commerce platform 205 and may purchase (235) mobile gift cards from a carrier 215 (e.g., T-MOBILE, AT&T, VERIZON WIRELESS, etc.) or other distributor 105 such as a social networking Web site. The targeted marketing messages are assisted by the ability of merchant 225 to submit marketing rules, content, or both (265) to mobile commerce platform 205.

Merchant 225 receives payment authorizations (255) from mobile commerce platform 205 in conjunction with the mobile payments technology mentioned above in connection with U.S. patent application Ser. No. 11/624,620. The mobile payments process is summarized briefly below.

Mobile commerce platform 205 facilitates the activation (230) of mobile gift cards sold by a carrier or other entity 215 (or other distributor 105) in cooperation with gift card system 210 via communication link 275. Gift card system 210 also provides, among other things, settlement and reporting services (270) to merchant 225.

When mobile user 220 makes a purchase using a mobile gift card, mobile user 220 contacts mobile commerce platform 205 using any of a variety of access methods (e.g., SMS, MMS, WAP or other browser technology, application, voice) to provide an optional personal identification number (PIN) by which mobile commerce platform 205 authenticates mobile user 220 (240). Mobile commerce platform 205 provides mobile user 220 with one-time perishable (time-limited) authorization codes and balances (240) for various tenders available to that user, including mobile gift cards. In the present example, mobile user 220 selects a specific mobile gift card to be used in making the purchase. The mobile-payments-enabled merchant 225 submits the authorization code provided by mobile user 220 and the transaction amount to mobile commerce platform 205 (255). Mobile commerce platform 205 routes the transaction parameters to gift card system 210, which ensures that the requested amount is available on the indicated mobile gift card. If everything checks out, gift card system 210 informs mobile commerce platform 205, which, in turn, conveys a return authorization to the merchant 225, completing the transaction (255).

With this high-level background in place, the remainder of this Detailed Description focuses primarily on the distribution and transfer of mobile gift cards.

Figure 3:
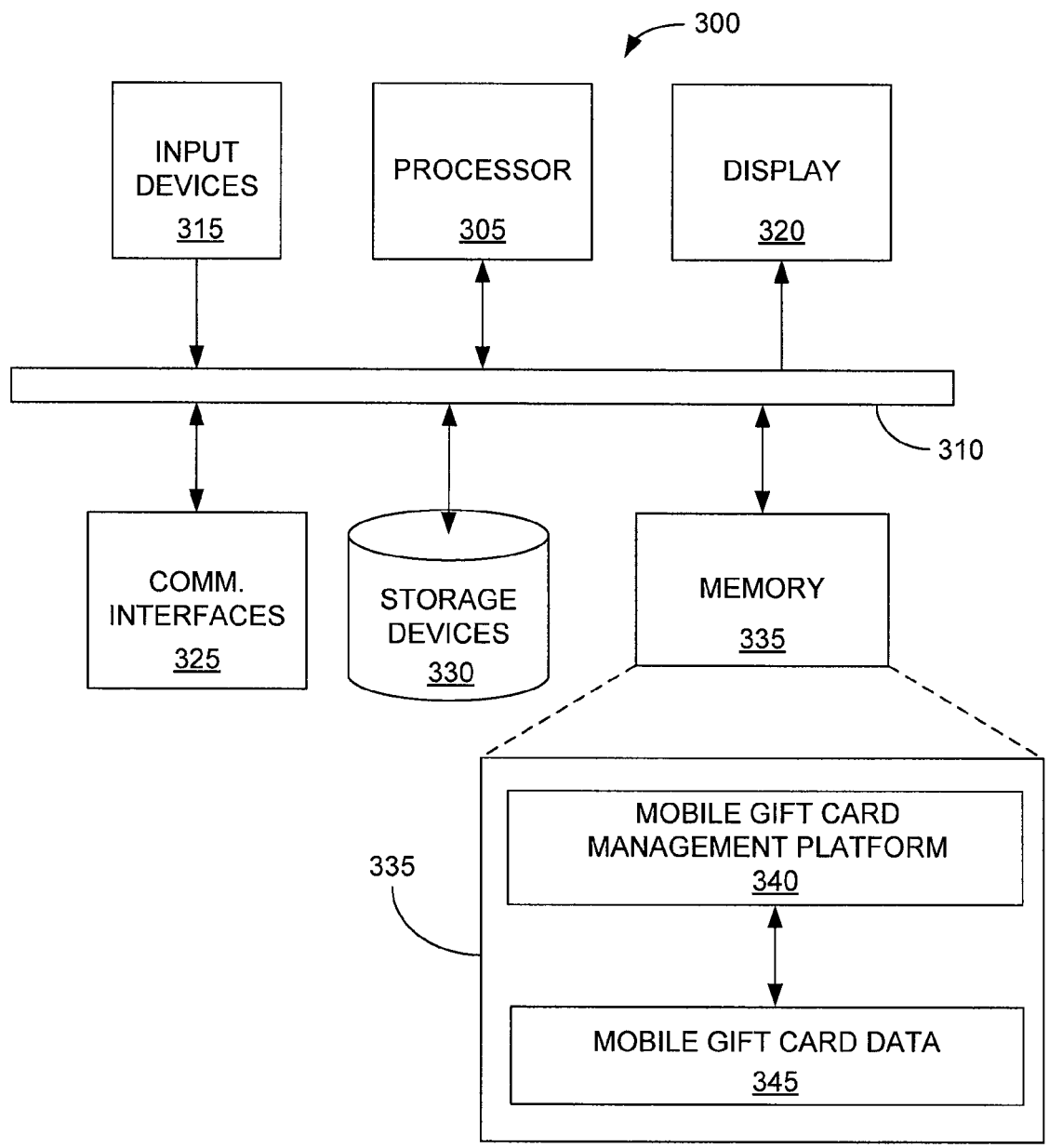
FIG. 3 is a functional block diagram of a server that distributes and manages mobile gift cards in accordance with an illustrative embodiment of the invention.

FIG. 3 is a functional block diagram of a computer server ("server") 300 that distributes and manages mobile gift cards in accordance with an illustrative embodiment of the invention. In this embodiment, server 300 is part of mobile commerce platform 205 (see FIG. 2). In FIG. 3, processor 305 communicates over data bus 310 with input devices 315, display 320, communication interfaces ("COMM. INTERFACES" in FIG. 3) 325, storage devices 330 (e.g., hard disk drives or flash memory), and memory 335. Though FIG. 3 shows only a single processor, multiple processors or a multi-core processor may be present in some embodiments.

Input devices 315 include, for example, a keyboard, a mouse or other pointing device, or other devices that are used to input data or commands to server 300 to control its operation. Communication interfaces 325 may include, for example, various serial or parallel interfaces for communicating with network 135 (see FIG. 1) or one or more peripherals.

Memory 335 may include, without limitation, random access memory (RAM), read-only memory (ROM), flash memory, magnetic storage (e.g., a hard disk drive), optical storage, or a combination of these, depending on the particular embodiment. In FIG. 3, memory 335 includes mobile gift card management platform 340, which distributes and manages mobile gift cards. In doing so, mobile gift card management platform 340 accesses and manipulates mobile gift card data 345, which may reside, at least in part, on storage devices 330.

As mentioned above, mobile gift card management platform 340 implements a server-side digital wallet for the mobile gift card data 345. A "mobile gift card" is, thus, a digital construct (stored digital data) that replaces a physical (e.g., plastic, magnetically encoded) gift card. In this illustrative embodiment, server 300 stores account information for each mobile-gift-card holder. That is, each mobile-gift-card user initially creates an account on server 300. This account information includes, for each mobile gift card belonging to a particular user, (1) the user's mobile phone number, (2) the account number of the particular mobile gift card (analogous to a card number of a physical gift card), and (3) the merchant that issued the mobile gift card. In some embodiments, server 300 stores additional information or different information from that just indicated. Note, however, that, in this particular embodiment, the balance remaining on the mobile gift card is not stored on server 300. Instead, the balance is tracked by the gift-card service provider 140 that operates the applicable gift card system 210. As mentioned above, no credentials associated with a mobile gift card reside on the user's mobile device.

In one illustrative embodiment, mobile gift card management platform 340 is implemented as software that is executed by processor 305. Such software may be stored, prior to its being loaded into RAM for execution by processor 305, on any suitable computer-readable storage medium such as a hard disk drive, an optical disk, or a flash memory. In general, the functionality of mobile gift card management platform 340 may be implemented as software, firmware, hardware, or any combination or sub-combination thereof. The methods carried out by mobile gift card management platform 340 are explained more fully below in connection with FIGS. 4-7.

A typical application for mobile gift cards is a situation in which User A wishes to give User B a gift card (e.g., User B has a birthday coming up). From a user perspective, User A can communicate with server 300 of mobile commerce platform 205 in a variety of different ways to purchase a mobile gift card for User B. Examples include, without limitation, a Web site hosted by server 300 (or another server elsewhere on the network) and visited by User A using a client personal computer (PC), a Web site or other portal accessed using User A's cellular or PCS phone, a visit by User A at the merchant's store, or other avenues (e.g., User A's wireless carrier or a social networking Web site), as discussed above. User A can employ methods such as, without limitation, SMS, MMS, WAP (a microbrowser on a mobile device), or voice (in person or over the phone) to initiate a gift-card purchase for User B. In general, User A simply needs a way to communicate, directly or indirectly, with server 300. The foregoing example of User A purchasing a mobile gift card for User B will be referred to frequently in the description of FIGS. 4-7 that follows.

Figure 4:
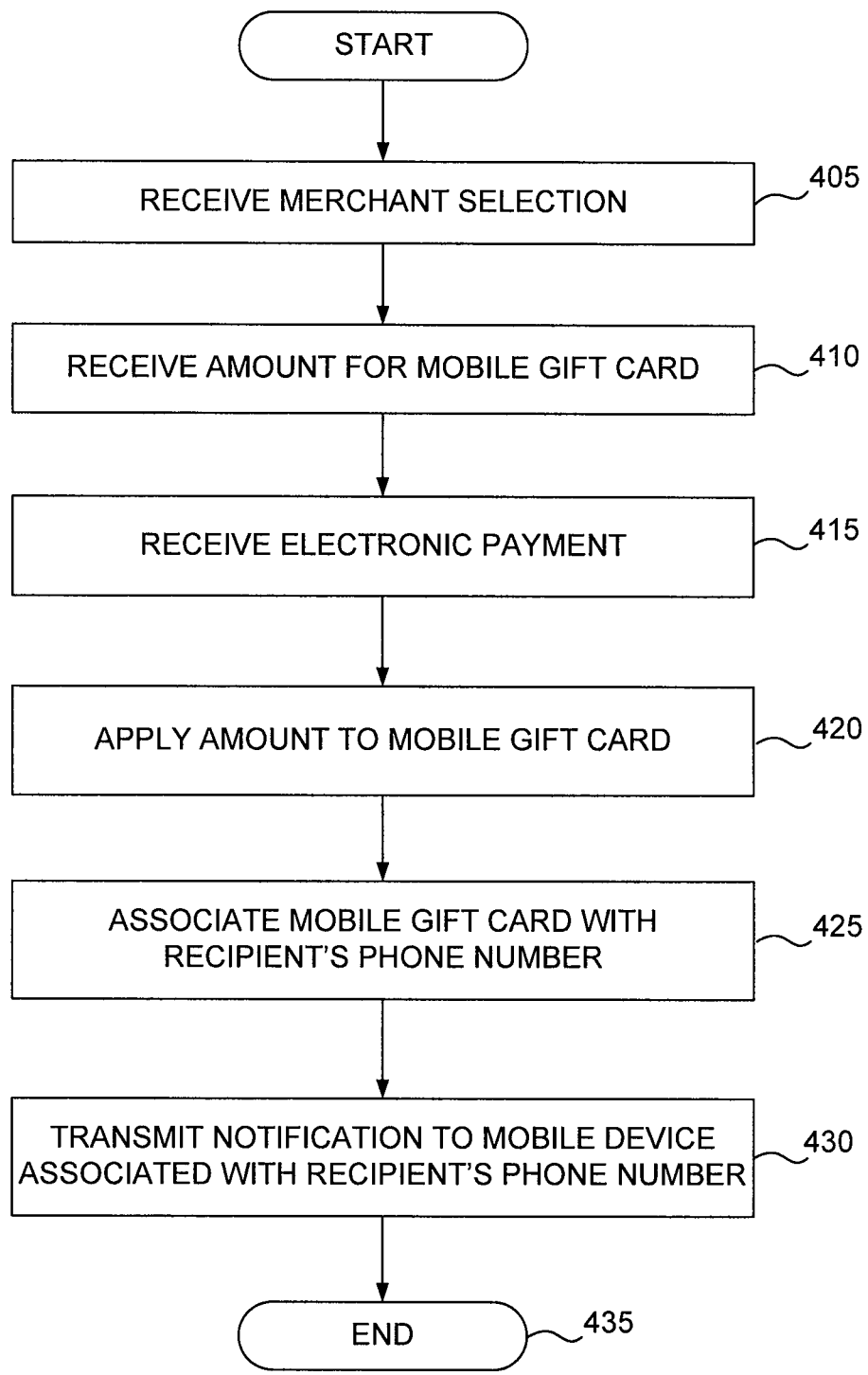
FIG. 4 is a flowchart of a method for distributing a mobile gift card in accordance with an illustrative embodiment of the invention.

FIG. 4 is a flowchart of a method for distributing a mobile gift card in accordance with an illustrative embodiment of the invention. At 405, mobile gift card management platform 340 receives, from User A, a selection of a merchant with which to associate a new mobile gift card. As discussed above, User A's selection of a merchant may be from a list provided by an aggregated distributor 105 that markets mobile gift cards for a variety of different merchants, or User A may purchase the gift card from a source that sells only the particular merchant's gift cards (e.g., the merchant's Web site or store).

At 410, mobile gift card management platform 340 receives, from User A, an indication of the monetary amount for the mobile gift card to be created and distributed, and, at 415, receives an electronic payment for that amount from User A.

At 420, mobile gift card management platform 340 applies the specified amount to the mobile gift card and, at 425, associates the mobile gift card with User B's (the recipient's) phone number (provided by User A).

At 430, mobile gift card management platform 340 transmits or otherwise conveys a notification regarding the mobile gift card to a mobile device (e.g., a cellular or PCS phone) associated with User B's (the recipient's) phone number provided by User A above in Block 425.

The notification transmitted at 430 may be accomplished in a variety of ways, including, without limitation, an SMS message, an MMS message, a voice message, or an application. The application, in some embodiments, is a WAP browser or other type of Internet browser running on the mobile-gift-card recipient's mobile device. In other embodiments, the application is a specialized application other than a browser.

In some embodiments, the notification to the recipient includes a personalized message created by User A such as, "Happy birthday, Amy! I've sent you a mobile gift card for JC PENNY. Enjoy! Marsha."

Following receipt of the mobile gift card, User B can, after proper activation with mobile gift card management platform 340, use the mobile gift card to purchase goods or services from the merchant associated with the mobile gift card in a variety of different ways, as explained above (see discussion of secure payments in connection with FIG. 2 above).

Activation can also take different forms, depending on the particular embodiment. In some embodiments, for example, the notification User B receives includes instructions to User B for how to activate the mobile gift card. For example, the notification may be an SMS message stating, "Bob, you've received a $100 mobile gift card for SPORTS AUTHORITY. Please visit mocapay.com to activate your mobile gift card." Note that, in such embodiments, the notification includes a hyperlinked Uniform Resource Locator (URL) for User B to follow to complete the activation process. Alternatively, User B could be provided with a phone number, an e-mail address, or other contact information for accomplishing activation. When User B contacts mobile commerce platform 205 to activate the mobile gift card, User B is directed to create an account, if User B does not already have one. Mobile commerce platform 205 guides User B through this straightforward process.

In another embodiment, if User B already has an account with mobile commerce platform 205, the mobile gift card is activated automatically when the notification is transmitted to User B, which makes the mobile gift card available to User B immediately upon receipt of the notification. To spend the mobile gift card, User B communicates with the server-side digital wallet supported by mobile gift card management platform 340 in the manner described above in connection with FIG. 2.

At 435, the method in FIG. 4 terminates.

Figure 5:
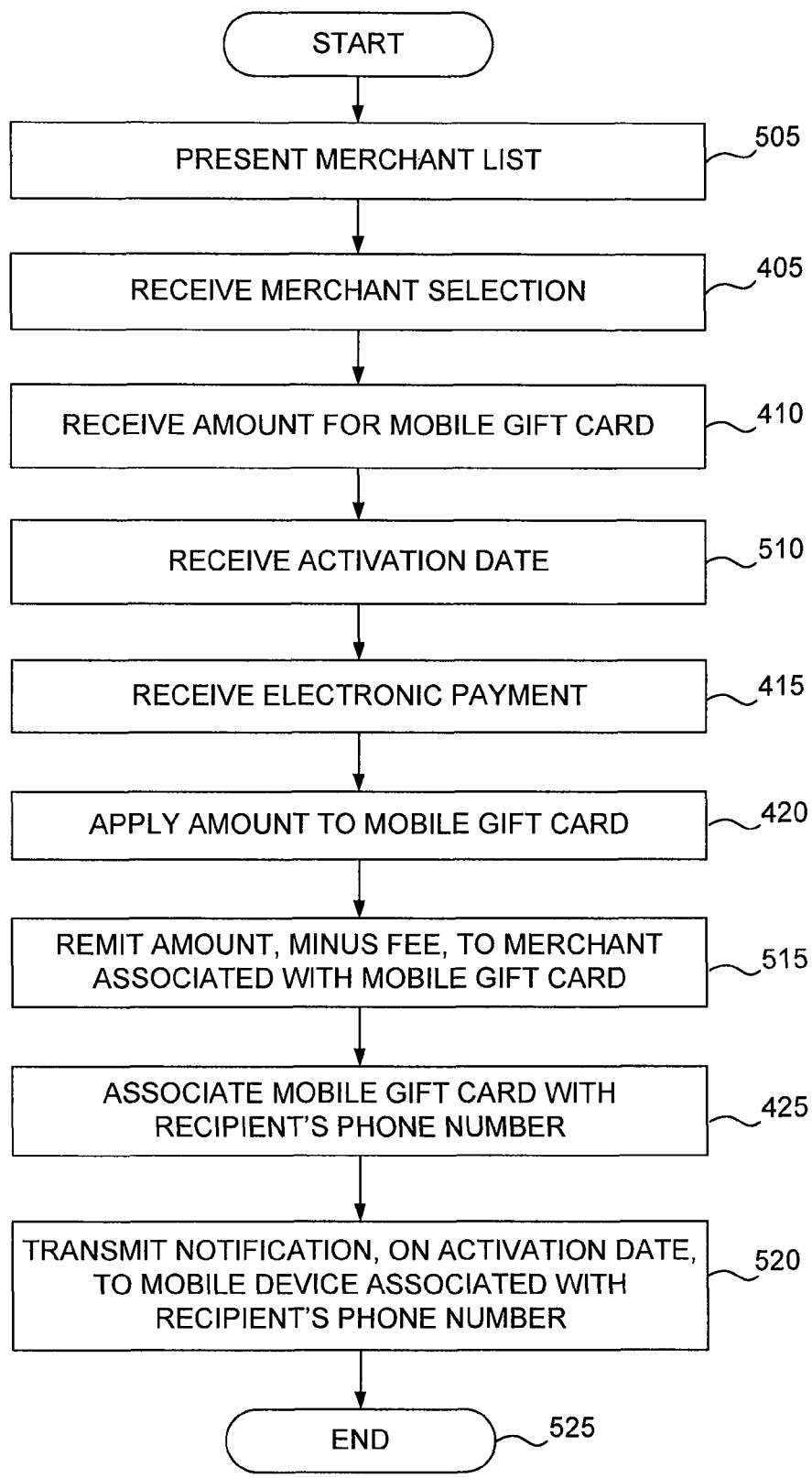
FIG. 5 is a flowchart of a method for distributing a mobile gift card in accordance with another illustrative embodiment of the invention.

FIG. 5 is a flowchart of a method for distributing a mobile gift card in accordance with another illustrative embodiment of the invention. The method in FIG. 5 is similar to that shown in FIG. 4. This embodiment presumes that User A purchases the mobile gift card from an aggregated distributor 105 (an entity offering mobile gift cards from multiple merchants). At 505, mobile gift card management platform 340 (or a separate aggregated distribution system that communicates with server 300) presents User A with an aggregated list of available merchants from which to purchase a mobile gift card. As noted in connection with FIG. 4, mobile gift card management platform 340 receives, at 405, a selection from User A of a particular merchant.

At 510, mobile gift card management platform 340 receives a specific activation date from User A (the party purchasing the mobile gift card). For example, if User B's birthday is still five days in the future, User A would like to postpone notification of the mobile gift card until User B's birthday. In such an embodiment, notification of the mobile gift card is conveyed to User B on the activation date specified by User A.

At 515, mobile gift card management platform 340 causes the amount of the mobile gift card purchased by User A, minus a predetermined fee that goes to merchant's agent 110, to be remitted to the applicable merchant associated with the mobile gift card. Payment of the merchant is accomplished via the settlement process mentioned above in connection with FIG. 2.

Block 520 includes the modification mentioned above that the notification of the mobile gift card to User B is conveyed to User B's mobile device on the activation date specified by User A. At 525, the method terminates.

In some embodiments, the purchaser of a mobile gift card and the recipient of that mobile gift card may be one and the same person. That is, a user may, instead of purchasing a mobile gift card for another person, purchase a mobile gift card for himself or herself.

Figure 6:
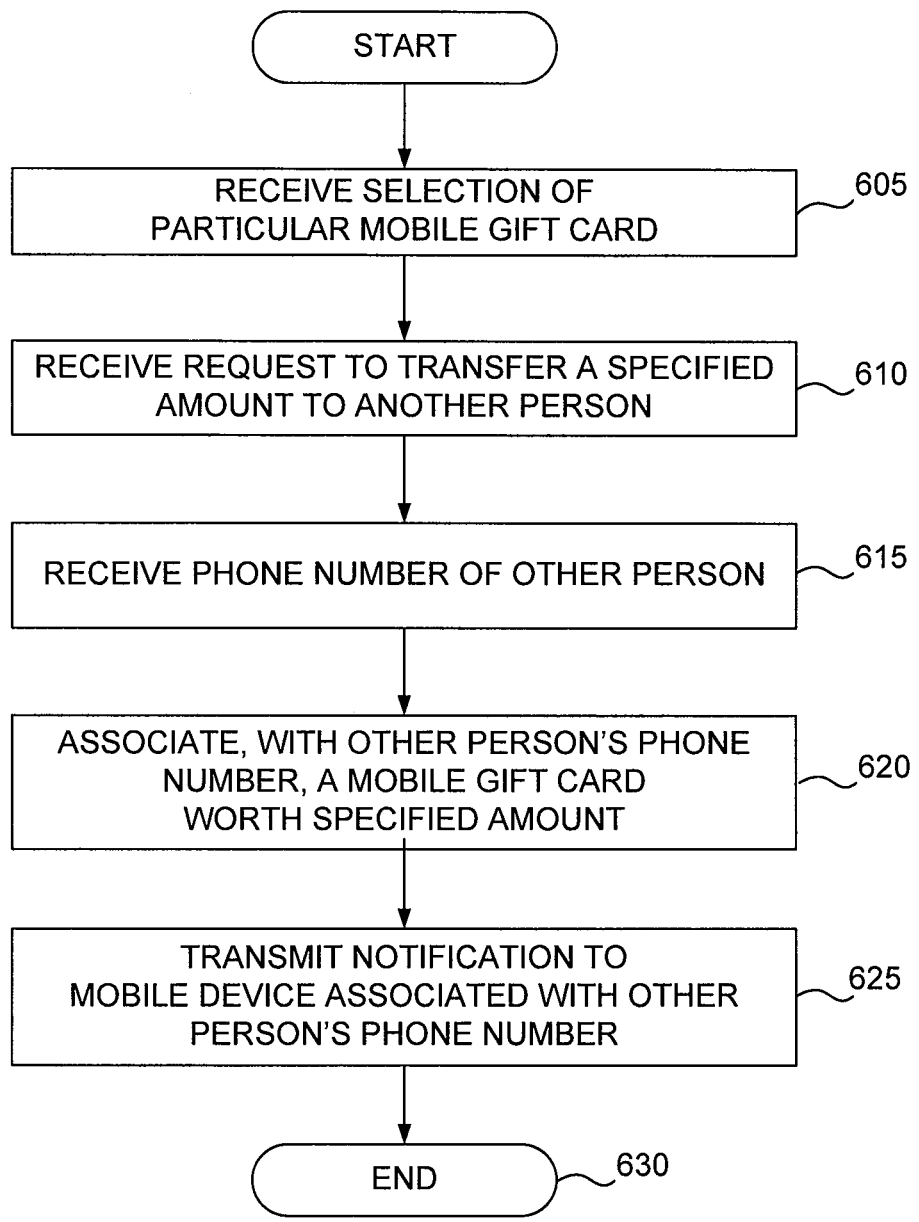
FIG. 6 is a flowchart of a method for transferring a mobile gift card from one user to another in accordance with an illustrative embodiment of the invention.
Figure 7:
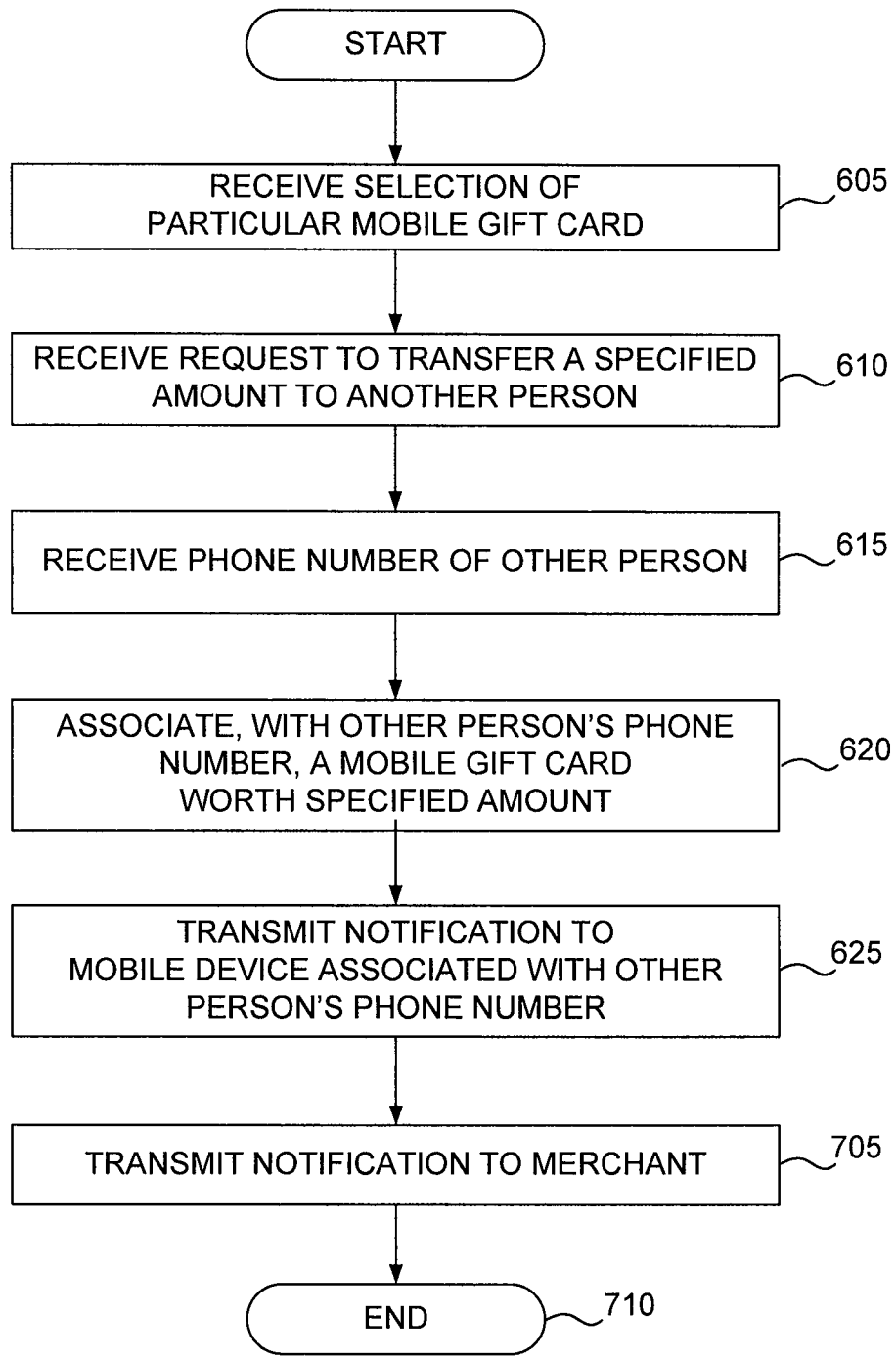
FIG. 7 is a flowchart of a method for transferring a mobile gift card from one user to another in accordance with another illustrative embodiment of the invention.

FIG. 6 is a flowchart of a method for transferring a mobile gift card from one user to another in accordance with an illustrative embodiment of the invention. In the discussion of FIGS. 6 and 7 below, use of the terminology "User A" and "User B" to identify distinct persons is continued. In FIGS. 6 and 7, it is assumed that User A has purchased a mobile gift card for User B and that User B has activated that mobile gift card (or that it was automatically activated). It is also assumed that User B wishes to transfer all or a portion of the balance of the mobile gift card to a third user, User C.

At 605, User B communicates with mobile gift card management platform 340 via any of the methods mentioned above (e.g., SMS, MMS, WAP, application, voice) or any others that might be applicable in a particular embodiment, and mobile gift card management platform 340 receives a selection of a particular mobile gift card from among those in User B's server-side digital wallet. For example, User B might contact mobile gift card management platform 340 using a cellular phone equipped with a WAP browser and view a list of available gift cards and their balances. At 610, mobile gift card management platform 340 receives a request from User B to transfer all or a portion of the selected mobile gift card to another person (User C).

At 615, mobile gift card management platform 340 receives, from User B, a phone number associated with User C. At 620, mobile gift card management platform 340 associates, with User C's phone number, a mobile gift card in the amount of the transfer specified by User B at Block 610. The transferred mobile gift card belonging to User C has the same merchant associated with it as the original mobile gift card belonging to User B.

At 625, mobile gift card management platform 340 transmits or otherwise conveys a notification of User C's new mobile gift card to a mobile device associated with User C's (the recipient's) phone number. At 630, the method terminates.

Note that, in some embodiments, where User B transfers the entire remaining balance of a mobile gift card to User C, it is not necessary for mobile gift card management platform 340 to create a separate mobile gift card for User C. In that case, the existing mobile gift card can simply be remapped from an association with User B's phone number to an association with User C's phone number, effectively deleting that mobile gift card from User B's account. Where User B elects to transfer less than the entire remaining balance, however, User B continues to hold the original mobile gift card with its remaining balance, and a new, separate mobile gift card in the amount of the transfer is created for User C.

Note that this ability to "re-gift" mobile gift cards as described above essentially puts User B in the position of being a mobile gift card distributor 105, and User C can do likewise, and so on. Once created, the separate mobile gift cards, in this illustrative embodiment, are completely independent of each other.

In the case of a mobile gift card that a user receives through a transfer from another user, all of the same options and features described above regarding notification (e.g., personalization), activation, and use (payments) apply equally to such a transferred mobile gift card.

FIG. 7 is a flowchart of a method for transferring a mobile gift card from one user to another in accordance with another illustrative embodiment of the invention. The method shown in FIG. 7 is similar to that in FIG. 6. In this embodiment, however, mobile gift card management platform 340, in connection with a transfer of all or a portion of a mobile gift card from one user to another, transmits or otherwise conveys notification of the transfer and, where applicable, the existence of the new mobile gift card belonging to User C, to the merchant associated with the mobile gift card. A partial transfer is advantageous to the issuing merchant because, if the transfer was only partial and not complete, the merchant can now expect an additional customer (User C) to visit its store. At 710, the method terminates.

In conclusion, the present invention provides, among other things, a system and method for re-distributing and transferring mobile gift cards. Those skilled in the art can readily recognize that numerous variations and substitutions may be made in the invention, its use, and its configuration to achieve substantially the same results as achieved by the embodiments described herein. Accordingly, there is no intention to limit the invention to the disclosed exemplary forms. Many variations, modifications, and alternative constructions fall within the scope and spirit of the disclosed invention as expressed in the claims.

What is claimed is:

1. A computer-server-based method for transferring a mobile gift card from a first user to a second user, the computer-server-based method comprising:
   receiving at the computer server, from a list of one or more mobile gift cards associated with a phone number of the first user, a selection of a particular mobile gift card, the particular mobile gift card being associated with a particular merchant;
   receiving, at the computer server, a request to transfer a specified monetary amount from a balance of the particular mobile gift card to a second user;
   receiving, at the computer server, a phone number of the second user;
   associating, with the second user's phone number at the computer server, a separate mobile gift card having an associated balance equal to the specified monetary amount, the separate mobile gift card being associated with the particular merchant;
   transmitting, from the computer server, a notification of the separate mobile gift card to a mobile device associated with the second user's phone number; and
   storing an account number associated with the separate mobile gift card at the computer server instead of at the mobile device associated with the second user's phone number such that the computer server communicates with the mobile device associated with the second user's phone number to conduct secure purchases using the separate mobile gift card on behalf of the recipient.

2. The computer-server-based method of claim 1, wherein the specified monetary amount is equal to the entire balance of the particular mobile gift card.

3. The computer-server-based method of claim 2, wherein the separate mobile gift card and the particular mobile gift card are one and the same and wherein the particular mobile gift card is remapped from an association with the first user's phone number to an association with the second user's phone number.

4. The computer-server-based method of claim 1, wherein the specified monetary amount is less than the entire balance of the particular mobile gift card.

5. The computer-server-based method of claim 1, further comprising:
   transmitting to the particular merchant a notification of the transfer of the specified monetary amount from the balance of the particular mobile gift card to the second user and of the existence of the separate mobile gift card.

6. The computer-server-based method of claim 1, wherein the notification includes a personalized message for the second user from the first user.

7. The computer-server-based method of claim 1, wherein the notification includes instructions to the second user regarding how to activate the separate mobile gift card at the computer server.

8. The computer-server-based method of claim 1, wherein the separate mobile gift card is activated automatically at the computer server upon receipt, by the mobile device, of the notification.

9. The computer-server-based method of claim 1, wherein the first user issues the request via at least one of a Short Message Service (SMS) message, a Multimedia Messaging Service (MMS) message, an Internet browser executing on a mobile device, an Internet browser executing on a personal computer, and a voice message.

10. The computer-server-based method of claim 1, wherein the notification includes a Short Message Service (SMS) message.

11. The computer-server-based method of claim 1, wherein the notification includes a voice message.

12. The computer-server-based method of claim 1, wherein the notification is conveyed to the recipient via an application executing on the mobile device.

13. The computer-server-based method of claim 12, wherein the application is an Internet browser.

14. The computer-server-based method of claim 1, wherein the mobile device is a cellular telephone.

15. The computer-server-based method of claim 1, wherein a balance associated with the mobile gift card is not stored at the mobile device.

16. A system for transferring a mobile gift card from a first user to a second user, the system comprising:
  at least one processor; and
  a memory containing a plurality of program instructions executable by the at least one processor, the plurality of program instructions being configured to cause the at least one processor to:
    receive, from a list of one or more mobile gift cards associated with a phone number of the first user, a selection of a particular mobile gift card, the particular mobile gift card being associated with a particular merchant;
    receive a request to transfer a specified monetary amount from a balance of the particular mobile gift card to a second user;
    receive a phone number of the second user;
    associate, with the second user's phone number, a separate mobile gift card having an associated balance equal to the specified monetary amount, the separate mobile gift card being associated with the particular merchant;
    transmit a notification of the separate mobile gift card to a mobile device associated with the second user's phone number; and
    store an account number associated with the separate mobile gift card at the computer server instead of at the mobile device associated with the second user's phone number such that the computer server communicates with the mobile device associated with the second user's phone number to conduct secure purchases using the separate mobile gift card on behalf of the recipient.

17. The system of claim 16, wherein the system includes a server in communication with the Internet.

18. The system of claim 16, wherein the mobile device is a cellular telephone.

19. The system of claim 16, wherein the specified monetary amount is equal to the entire balance of the particular mobile gift card.

20. The system of claim 19, wherein the separate mobile gift card and the particular mobile gift card are one and the same and wherein the plurality of program instructions are configured to cause the at least one processor to remap the particular mobile gift card from an association with the first user's phone number to an association with the second user's phone number.

21. The system of claim 16, wherein the specified monetary amount is less than the entire balance of the particular mobile gift card.

22. The system of claim 16, wherein a balance associated with the mobile gift card is not stored at the mobile device.

23. A system for transferring a mobile gift card from a first user to a second user, the system comprising:
  at least one processor; and
  a memory containing a plurality of program instructions executable by the at least one processor, the plurality of program instructions being configured to cause the at least one processor to:
    receive, from a list of one or more mobile gift cards associated with a phone number of the first user, a selection of a particular mobile gift card, the particular mobile gift card being associated with a particular merchant;
    receive a request to transfer a specified monetary amount from a balance of the particular mobile gift card to a second user;
    receive a phone number of the second user;
    associate, with the second user's phone number, a separate mobile gift card having an associated balance equal to the specified monetary amount, the separate mobile gift card being associated with the particular merchant;
    transmit a notification of the separate mobile gift card to a mobile device associated with the second user's phone number;
    store an account number associated with the separate mobile gift card at the computer server instead of at the mobile device associated with the second user's phone number such that the computer server communicates with the mobile device associated with the second user's phone number to conduct secure purchases using the separate mobile gift card on behalf of the recipient; and
    transmit, to the mobile device, a one-time-use perishable first authorization code in response to a communication from the mobile device to access the separate mobile gift card in connection with a purchase by the second user from the particular merchant associated with the mobile gift card.

24. The system of claim 23, wherein the specified monetary amount is equal to the entire balance of the particular mobile gift card.

25. The system of claim 24, wherein the separate mobile gift card and the particular mobile gift card are one and the same and wherein the plurality of program instructions are configured to cause the at least one processor to remap the particular mobile gift card from an association with the first user's phone number to an association with the second user's phone number.

26. The system of claim 23, wherein the specified monetary amount is less than the entire balance of the particular mobile gift card.

27. The system of claim 23, wherein a balance associated with the mobile gift card is not stored at the mobile device.

* * * * *